(12) United States Patent
Hung et al.

(10) Patent No.: US 9,529,446 B2
(45) Date of Patent: Dec. 27, 2016

(54) RE-ANCHORABLE VIRTUAL PANEL IN THREE-DIMENSIONAL SPACE

(71) Applicant: National Taiwan University, Taipei (TW)

(72) Inventors: Yi-Ping Hung, Taipei (TW); Shih-Yao Lin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/807,790

(22) Filed: Jul. 23, 2015

(65) Prior Publication Data
US 2016/0187991 A1  Jun. 30, 2016

(30) Foreign Application Priority Data
Dec. 25, 2014 (TW) .............................. 103145579 A

(51) Int. Cl.
*G06F 3/01* (2006.01)
*G09G 5/18* (2006.01)

(52) U.S. Cl.
CPC ............... *G06F 3/017* (2013.01); *G06F 3/013* (2013.01); *G09G 5/18* (2013.01)

(58) Field of Classification Search
CPC ........ G06F 3/017; G06F 3/013; G06F 3/0304; G06F 3/011; G06F 3/0488; G09G 5/18
USPC ........................................................ 345/156
See application file for complete search history.

(56) References Cited

U.S. PATENT DOCUMENTS

| 8,947,351 | B1* | 2/2015 | Noble | G06F 3/0488 345/156 |
| 2010/0053322 | A1* | 3/2010 | Marti | G06F 3/011 348/135 |
| 2012/0194657 | A1* | 8/2012 | Ko | G02B 27/2264 348/56 |
| 2012/0233076 | A1* | 9/2012 | Sutcliffe | G06Q 30/02 705/50 |
| 2013/0050069 | A1* | 2/2013 | Ota | G06F 3/011 345/156 |
| 2015/0293525 | A1* | 10/2015 | Yamamoto | G06T 19/20 702/182 |

* cited by examiner

*Primary Examiner* — Fred Tzeng
(74) *Attorney, Agent, or Firm* — Rabin & Berdo, P.C.

(57) ABSTRACT

The present invention provides a re-anchorable virtual panel in a three-dimensional space, including a detection module, a recognition module and a display module. The detection module includes a finger position detection submodule and a hand feature extraction submodule. The finger position detection submodule extracts the position and direction of a user's fingers, and transmits the estimated information of the finger's position to the recognition module. The hand feature extraction submodule extracts the user's hand features from the input image sequence. After extracting the hand features, the hand feature extraction submodule transmits the information to the recognition module. The recognition module recognizes the position and direction of the user's fingers and hands, and determines the virtual panel's location and direction through the information. The recognition module recognizes hand gestures for controlling the virtual panel. The display module provides virtual feedback when the virtual panel is operated.

23 Claims, 14 Drawing Sheets

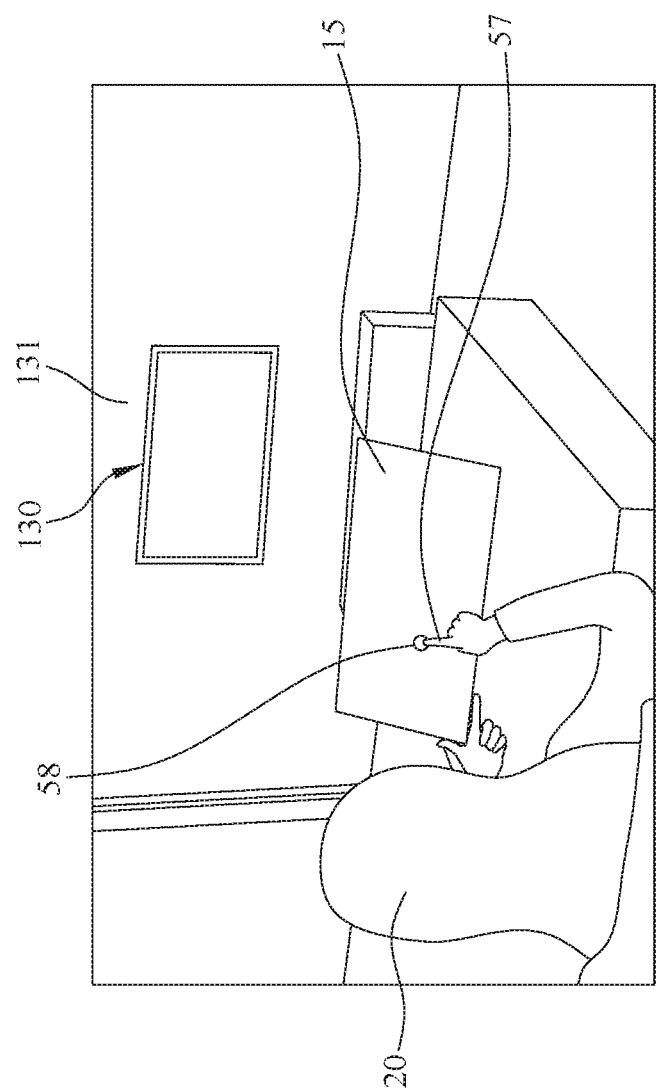

RE-ANCHORABLE VIRTUAL PANEL IN THREE-DIMENSIONAL SPACE

CROSS-REFERENCES TO RELATED APPLICATION

This application claims the priority of Taiwan patent application No. 103145579, filed on Dec. 25, 2014, which is incorporated herewith by reference.

BACKGROUND OF THE INVENTION

1. Field of the Invention

The present invention relates to the information and multimedia fields, and relates more specifically to the technology of a re-anchorable virtual panel and a multimedia system interface in three-dimensional space.

2. The Prior Arts

During the operation of traditional home appliances, handheld remote controls are usually used to control the home appliances. However, as more home appliance devices are purchased (such as a DVD player, a TV, and an air conditioner) by users, more handheld remote controls are also in use. This causes problems for the user while they are using and operating the home appliances, and the problems may be brought about by the confusion due to the existence of too many remote controls. The user may easily forget how to control the intended home appliances, and also where the handheld remote controls are placed. In order to increase the convenience during operation of the handheld remote controls and also to avoid the inconveniences caused by the handheld remote control device, it is necessary to provide a freehand remote control interface.

Some deficiencies still exist in the current technology of the freehand remote control interface. For instance, although some of the current technologies of virtual devices can achieve freehand remote controls, they use gestures that are pre-saved in the database to achieve the function of virtual controls, which can cause many restrictions and inconveniences for the user. Some technologies of virtual devices make use of a detector to detect an image sequence and a moving hand to achieve the goal of virtual controls. However, when the moving hand is detected, the user needs to raise both hands for a long time operation, which will cause the user's hands to be tired. Other technologies of virtual devices make use of the interaction between the user's hands and a virtual device generated by a projector on to a wall to achieve the operation of remote controls. Although this solution solves and avoids the situation where the users hands will be tired as a result of the user needing to make hand gestures for a long time operation in the space, the user still needs to stay in a predetermined location (a predetermined projected wall) to interact with the interface according to the corresponding patent proposing this operation environment, and this can hugely influence the convenience of operations.

If there is a specific method for the technology of the virtual device to turn on the virtual device, the user can freely determine the position and orientation of the virtual device in three-dimensional space. Accordingly, the mobility and convenience operation of the present invention will be largely enhanced for the user.

SUMMARY OF THE INVENTION

In order to solve above problems, the present invention provides a re-anchorable virtual panel in a three-dimensional space, comprising: a detection module, detecting an image sequence, analyzing a feature information of a user in the image sequence, and generating a feature analysis information of the user according to the feature information, and transmitting the feature analysis information; a recognition module, receiving the feature analysis information, recognizing whether the feature analysis information conforms to a setting virtual device feature and whether the setting virtual device feature lasts longer than a predetermined time or not, and transmitting the feature analysis information; and a display module, receiving the feature analysis information, and for displaying a virtual device for the user according to the feature analysis information; wherein the virtual device is continuously displayed until the display module receives another feature analysis information, and the virtual device is re-displayed for the user according to the other feature analysis information.

Preferably, the detection module includes a finger position detection submodule and a hand feature extraction submodule, the finger position detection submodule separates a hand position of the user from the image sequence according to an information on depth, the finger position detection submodule further calculates a three-dimensional finger position information of the user and generates the feature analysis information, and the hand feature extraction submodule analyzes the feature information of the user in the image sequence and generates the feature analysis information.

Preferably, the feature analysis information is one of a finger position information and a hand feature information of the user.

Preferably, the feature analysis information and the setting virtual device feature are an L-shaped hand gesture.

Preferably, the L-shaped hand gesture is formed by a thumb part and a forefinger part.

Preferably, the display module sets a generating position of the virtual device according to a position of a part between the thumb part and the forefinger part, determines a direction and an angle of the virtual device according to the positions of the thumb part and the forefinger part, and generates the virtual device.

Preferably, the display module determines the position and direction of the virtual device according to a gaze direction of the user and the position of the feature analysis information.

Preferably, the feature analysis information and the setting virtual device feature are the shape and color of the user's wrist.

Preferably, the feature analysis information and the setting virtual device feature are a mark of a watch worn by the user.

Preferably, the mark of the watch is a QR code.

Preferably, the hand feature extraction submodule is a RGB-D camera.

Preferably, the finger position detection submodule is a finger position extraction sensor (Leap Motion).

Preferably, the re-anchorable virtual panel is configured in a sensor.

Preferably, the sensor is configured in one of a head wear device, a home appliance device and a wall of an interior space.

According to an embodiment of the present invention, the present invention further provides a method of generating a re-anchorable virtual panel device, comprising the steps of: detecting an image sequence via a detection module, analyzing a feature information of a user in the image sequence, generating a feature analysis information of the user according to the feature information, and transmitting the feature analysis information to a recognition module; recognizing whether the feature analysis information is a setting virtual device feature by the recognition module; recognizing whether the setting virtual device feature lasts longer than a predetermined time by the recognition module after recognizing that the feature analysis information is the setting virtual device feature; transmitting the feature analysis information to a display module by the recognition module after recognizing that the setting virtual device feature lasts longer than the predetermined time; and displaying a virtual device for the user by the display module according to the feature analysis information; wherein the virtual device is continuously displayed until the display module receives another feature analysis information, and the virtual device is re-displayed according to the other feature analysis information.

Preferably, the feature analysis information is one of a finger position information and a hand feature information of the user.

Preferably, the feature analysis information and the setting virtual device feature are an L-shaped hand gesture.

Preferably, the L-shaped hand gesture is formed by a thumb part and a forefinger part.

Preferably, the feature analysis information and the setting virtual device feature are the user's wrist shape and color.

Preferably, the feature analysis information and the setting virtual device feature are a mark of a watch worn by the user.

Preferably, the mark of the watch is a QR code.

Preferably, the method of generating a re-anchorable virtual panel of the present invention further comprises the steps of: putting down the hand that sets the virtual device and raises another hand's forefinger after the virtual device is generated; continuously tracing a fingertip of the other hand's forefinger by the detection module and projecting a three-dimensional position of the fingertip on the virtual device in the two-dimensional space when the other hand's forefinger is detected by the detection module; and when the detection module detects that the forefinger performs a forward pressing action toward the virtual device, the forward pressing action being regarded as a click gesture.

Preferably, the forward pressing action is an accelerated motion with an acceleration greater than a threshold.

BRIEF DESCRIPTION OF THE DRAWINGS

The present invention can be understood in more detail by reading the subsequent detailed description in conjunction with the examples and references made to the accompanying drawings, wherein:

FIG. 13 is a schematic diagram illustrating the application of the present invention to achieve the remote operation of a TV;

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) depict only the preferred embodiments of the invention and shall not be considered as limitations to the scope of the present invention. Modifications of the shape of the present invention shall be considered within the spirit of the present invention.

Figure 1:
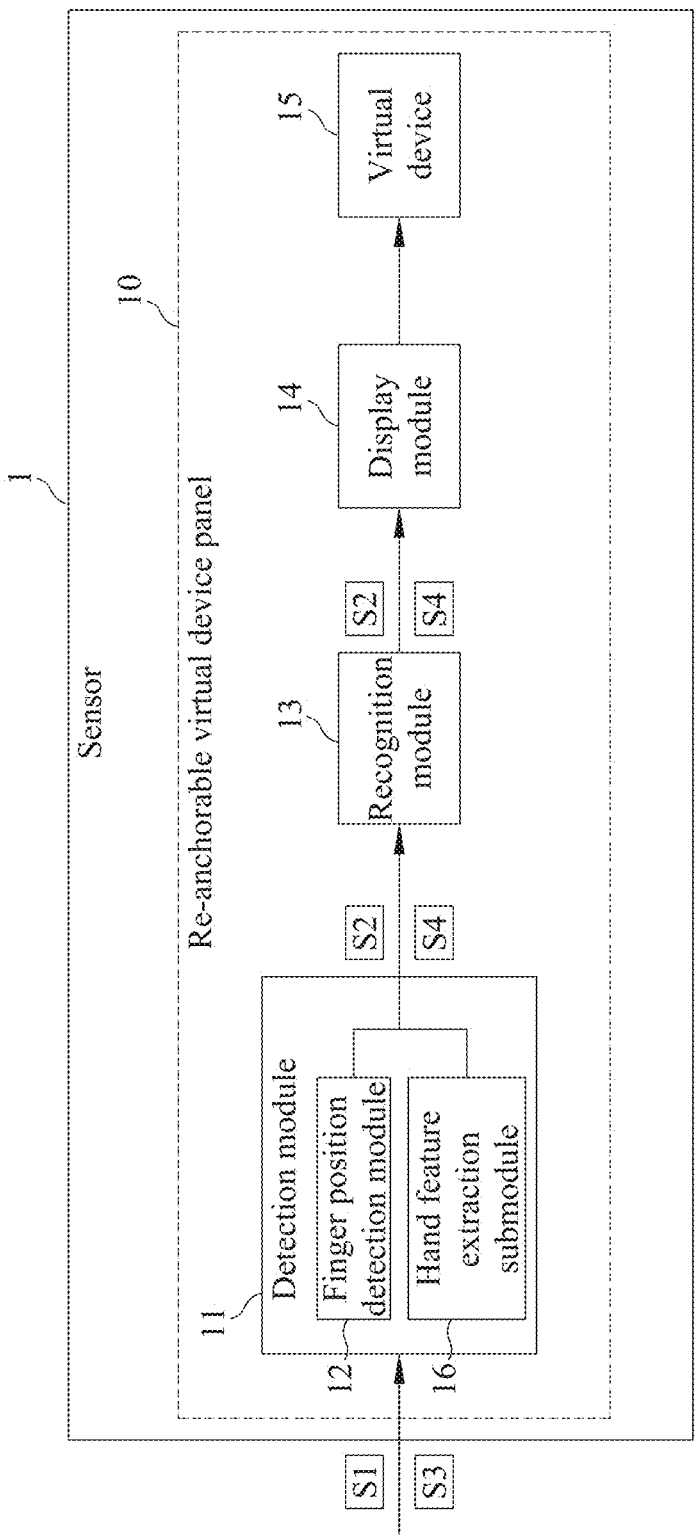
FIG. 1 is a systematic block diagram illustrating the re-anchorable virtual panel in the present invention.

FIG. 1 is a system diagram illustrating a re-anchorable virtual panel of the present invention. Please refer to FIG. 1. The re-anchorable virtual panel 10 may be configured in a sensor 1. The re-anchorable virtual panel 10 may include: a detection module 11, a recognition module 13, a display module 14 and a virtual device 15. According to an embodiment of the present invention, the re-anchorable virtual panel 10 may be a system module. The detection module 11 may include two input submodules. One is a module that is mainly based on a RGB-D camera (such as Microsoft Kinect), called a hand feature extraction submodule 16. In this type of module, the re-anchorable virtual panel 10 extracts an image sequence S1 in the first place, analyzes a feature information of a user in the image sequence S1 by means of the technology of image analysis, and transmits a feature analysis information S2. In the embodiment of the present invention, the RGB-D camera extracts an image sequence S1, extracts a hand finger feature from the image sequence S1 by means of the technology of image analysis, and transmits the extracted hand finger feature information to the recognition module 13. Another type is a submodule that is mainly based on a finger position extraction sensor (such as Leap Motion), called a finger position detection submodule 12. In this type of submodule, the re-anchorable virtual panel 10 directly transmits a three-dimensional finger position information (feature analysis information S2) calculated by the finger position extraction sensor 12 to the next module. In the present invention, the detection module 11 may choose the finger position detection submodule 12 or the hand feature extraction submodule 16 to analyze the image sequence S1. After the image sequence S1 is analyzed by the finger position detection submodule 12 or the hand feature extraction submodule 16, the finger position detection submodule 12 or the hand feature extraction submodule 16 generates a feature analysis information S2, and the detection module 11 transmits the feature analysis information S2 to the recognition module 13. In one embodiment of the present invention, the feature analysis information S2 is a finger position information of a user; and in other embodiments of the present invention, the feature analysis information S2 is a hand feature information of a user. After receiving the feature analysis information S2, the recognition module 13 may recognize whether or not the feature analysis information S2 conforms to a setting virtual device feature (not shown in the FIGs.). If the feature analysis information S2 of the image sequence S1 conforms to the setting virtual device feature within a period of time, the recognition module 13 then transmits the feature analysis information S2 to the display module 14. After receiving the feature analysis information S2, the display module 14 may display a virtual device 15 for the user according to the feature analysis information S2. If the recognition module 13 recognizes that the feature analysis information S2 does not conform to a setting virtual device feature (not shown in the FIGs.), or the feature analysis information S2 conforms to the setting virtual device feature (not shown in FIGs.) but does not last a period of time, the recognition module 13 will take no action. When the virtual device 15 is generated, the virtual device 15 will be displayed continuously until the recognition module 13 recognizes that a feature analysis information S4 of another image sequence S3 conforms to a setting virtual=device feature (not shown in the FIGs.) over another period of time. The recognition module 13 may transmit the feature analysis information S4 to the display module 14. After receiving the feature analysis information S4, the display module 14 can re-display a virtual=device 15 for the user according to the feature analysis information S4. In one embodiment of the present invention, the feature analysis information S4 may be a finger position information of the user; in another embodiment of the present invention, the feature analysis information S4 may be a hand feature information of the user.

The re-anchorable virtual panel 10 of the present invention may be configured in a sensor 1, and the sensor 1 may be configured in any place. In one embodiment of the present invention, the sensor 1 is configured on the head of a user; in another embodiment of the present invention, the sensor 1 is configured on a home appliance device. When the sensor 1 is configured on the head of the user; it is called a wearing mode; when the sensor 1 is configured on the home appliance device, the re-anchorable virtual panel 10 is called a remote mode. The sensor 1 may generate the virtual=device 15 for the user by means of the display module 14, no matter whether the sensor 1 is in a wearing mode or a remote mode.

Figure 2:
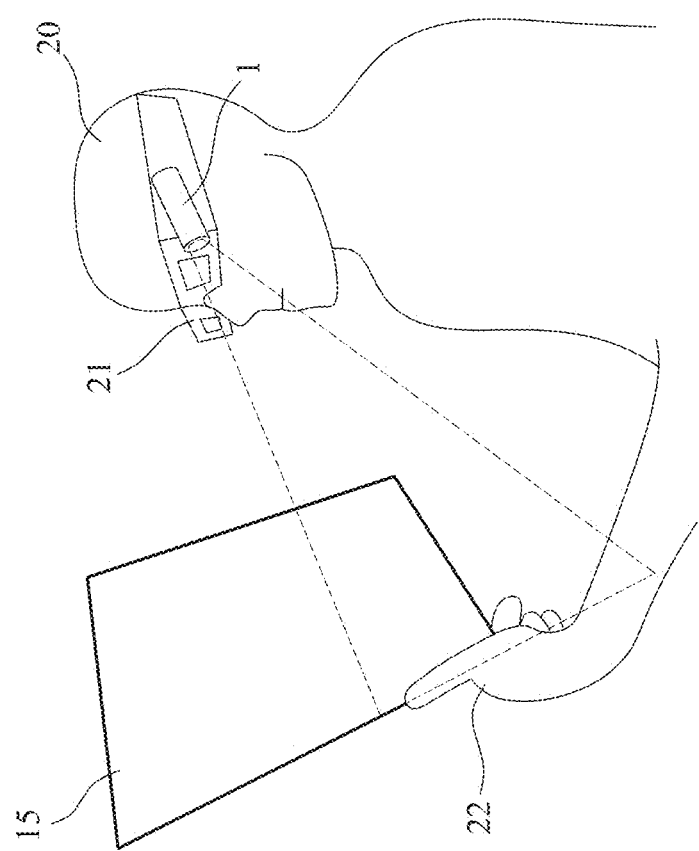
FIG. 2 is a schematic diagram illustrating the first method of operating the wearing mode of the present invention.

FIG. 2 is a schematic diagram illustrating the first operation method of the wearing mode of the present invention. Please refer to FIG. 2. In the first operation method of the wearing mode, the sensor 1 may be configured on a glasses device 21, which can be worn on the head by the user 20. When the sensor 1 detects a setting virtual=device gesture 22, the sensor 1 may turn on the virtual device 15 by means of the display module 14, and sets the direction and position of the virtual device 15 by means of the setting virtual device gesture 22.

Figure 3:
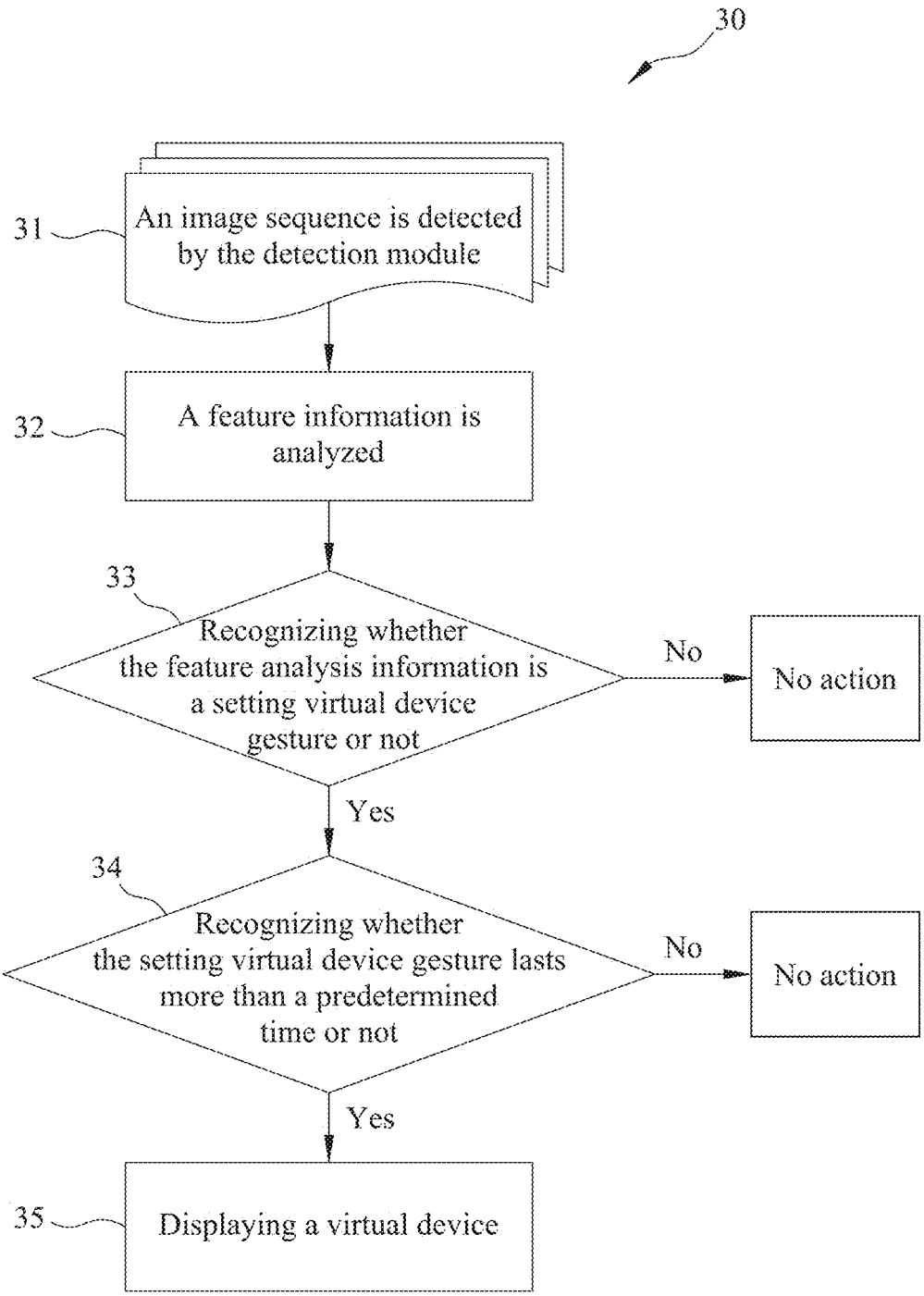
FIG. 3 is a flow diagram illustrating the method of generating the virtual device in accordance with the first embodiment of the present invention.

FIG. 3 is a flow diagram illustrating the steps of generating the virtual device in the first embodiment of the present invention. Please refer to FIGS. 1-3. The generating step 30 of the virtual device 15 may include steps 31-35. Step 31 is an image sequence S1 detected by the detection module 11 of the present invention. Step 32 is a feature information of a user 20 in the image sequence S1 analyzed by the detection module 11 of the present invention, a feature analysis information S2 of the user 20 may be generated by the feature information of the user 20 in the image sequence S1, and the detection module 11 may transmit the feature analysis information S2 to a recognition module 13. Step 33 shows the recognition module 13 of the present invention recognizing whether the feature analysis information S2 is a setting virtual device gesture 22 or not. Step 34 shows the recognition module 13 of the present invention recognizing whether the setting virtual device gesture 22 lasts longer than a predetermined time or not. Step 35 shows the display module 14 of the present invention displaying a virtual device 15 for the user 20. In the first embodiment of the present invention, a setting virtual device feature may be a setting virtual device gesture 22.

Each step is described in more details as follows. In step 31, the detection module 11 of the re-anchorable virtual panel 10 configured in the sensor 1 may detect the image sequence S1, and the finger position detection submodule 12 of the detection module 11 may analyze the feature information of the user 20 in the image sequence S1 and may generate a feature analysis information S2. In one embodiment of the present invention, the finger position detection submodule 12 may be a finger position extraction sensor (Leap Motion).

Figure 4:
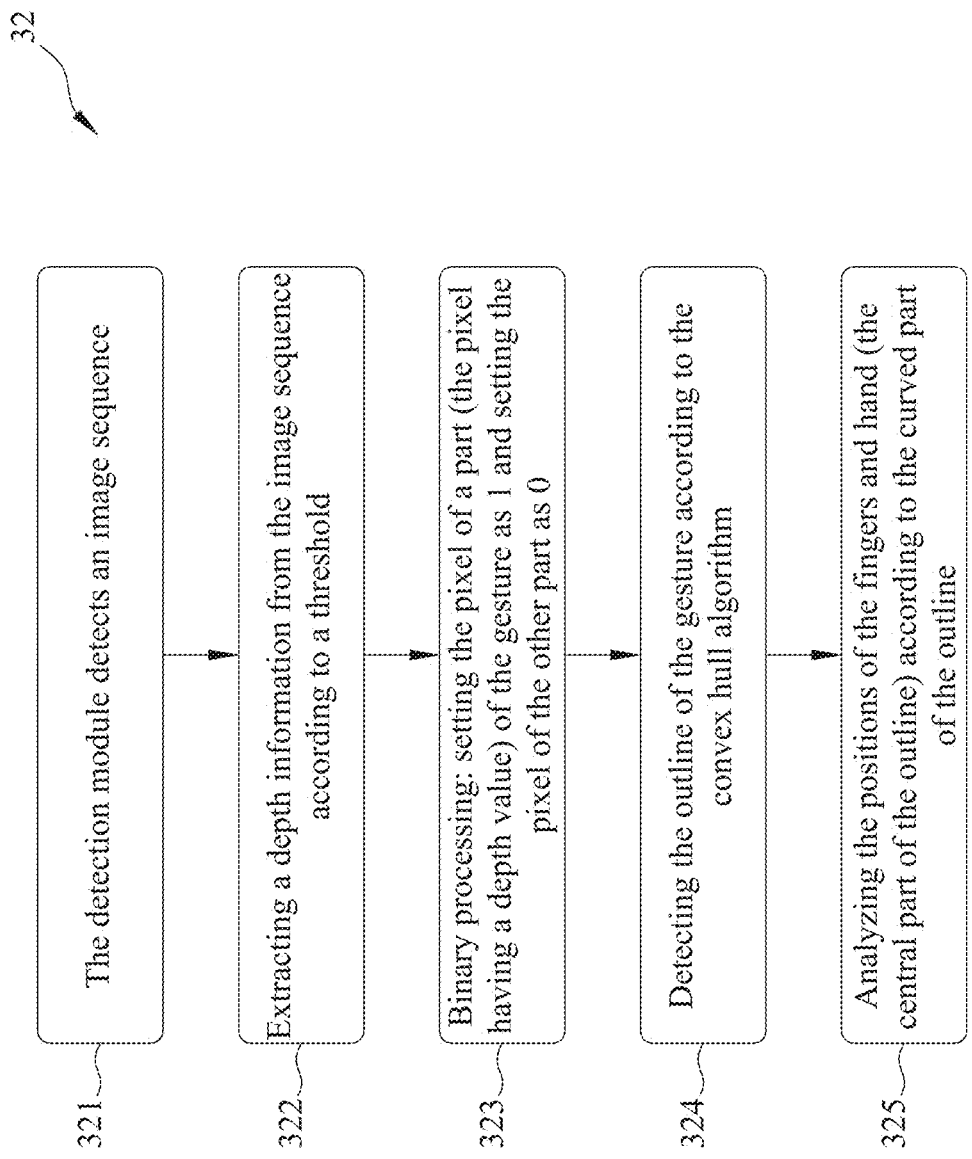
FIG. 4 is a flow diagram illustrating the goal of the finger position detection submodule analyzing the image information to accomplish the detection of the setting virtual device gesture.

In Step 32, the finger position detection submodule 12 of the detection module 11 may analyze the feature information of the user 20 in the image sequence S1. In the analyzing process, the finger position detection submodule 12 separates a hand position of the user 20 from the image sequence S1 according to the information on depth, and this is followed by the finger position detection submodule 12 using the Convex Hull Algorithm to detect the position and direction of every fingertip. FIG. 4 is a flow diagram illustrating the finger position detection submodule 12 analyzing the image information to accomplish the goal of detecting the setting virtual device gesture. FIGS. 5A-5D are schematic diagrams illustrating the process of detecting the setting virtual device gesture. Please refer to FIGS. 1, 2, 4, and 5A-5D. With regard to FIG. 5A, in Step 321, when the user 20 makes the setting virtual device hand gesture 22, the detection module 11 may detect the image sequence S1, and the finger position detection submodule 12 of the detection module 11 may analyze the image sequence S1. Please refer to FIG. 4). In Step 322, the finger position detection submodule 12 can extract an information on the depth of the setting virtual device gesture 22 from the image sequence S1 according to a threshold. In Step 323, after the finger position detection submodule 12 extracts the information on the depth of the setting virtual device gesture 22 from the image sequence S1 according to the threshold, the finger position detection submodule 12 may proceed with a binary processing, setting the pixel of a part (the pixel having a depth value) of the setting virtual device gesture 22 as 1 and setting the pixel of the other part as 0. In Step 324, after the finger position detection submodule 12 has finished the binary processing, the finger position detection submodule 12 detects an outline 51 of the setting virtual device gesture 22 according to the Convex Hull Algorithm. Please refer to FIG. 4. In Step 325, the finger position detection submodule 12 may analyze a feature analysis information S2 having distinguished parts of a central part 52, a wrist part 53, a thumb part 54 and a forefinger part 55 according to a curved part of the outline 51. The finger position detection submodule 12 may transmit the position information of the thumb part 54 and the forefinger part 55 to the recognition module 13.

In Step 33, the finger position detection submodule 12 may transmit the position information of the thumb part 54 and the forefinger part 55 to the recognition module 13. The recognition module 13 may recognize whether or not the thumb part 54 and the forefinger part 55 conform to an L-shaped hand gesture. This is followed by the detection module 11 continuously detecting the image sequence S1, and Step 33 goes back to Step 31.

In Step 34, if the recognition module 13 recognizes that the thumb part 54 and the forefinger part 55 conform to the L-shaped hand gesture, and the recognition module 13 recognizes that the setting virtual device gesture 22 of the image sequence S1 lasts longer than a predetermined time TH, the recognition module 13 may transmit the feature analysis information S2 to the display module 14. In this embodiment, the predetermined time TH is set as 3 seconds.

Figure 5B:
FIG. 5B is a schematic diagram illustrating the detection process of the setting virtual device gesture.
Figure 5A:
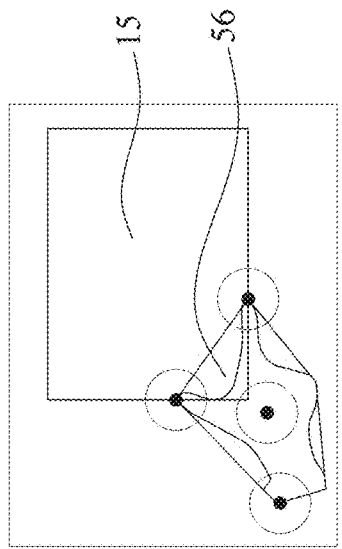
FIG. 5A is a schematic diagram illustrating the detection process of the setting virtual device gesture.
Figure 5D:
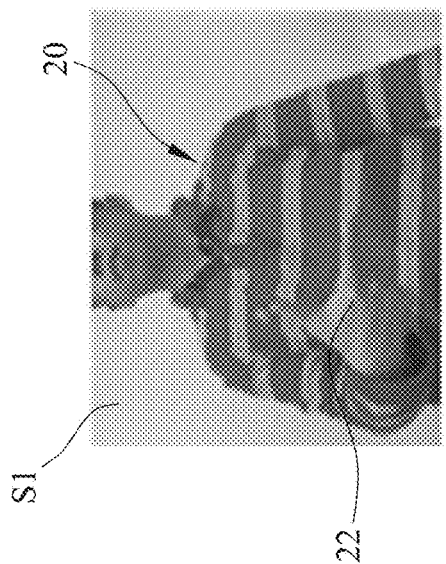
FIG. 5D is a schematic diagram illustrating the detection process of the setting virtual device gesture.
Figure 5C:
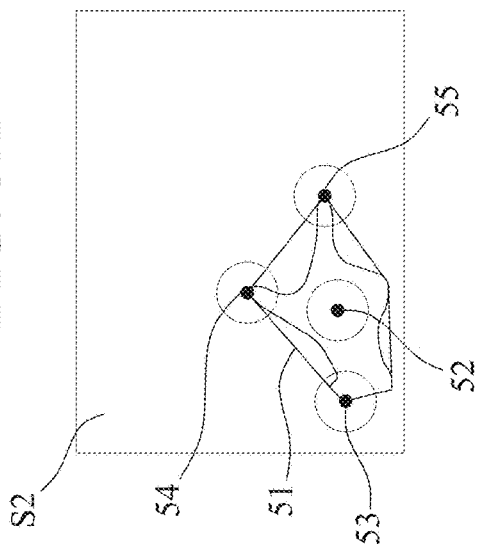
FIG. 5C is a schematic diagram illustrating the detection process of the setting virtual device gesture.

Please refer to FIG. 5D. As shown in Step 35, after the display module 14 receives the feature analysis information S2 the display module 14 may form the web between the thumb and the forefinger on the basis of the thumb part 54 and the forefinger part, in order for the web between the thumb and the forefinger to act as a setting position of the virtual device 15. This is also to determine the direction and angle of the virtual device 15 according to the positions of the thumb part 54 and the forefinger part 55, and to generate a virtual device 15 for the user 20. Moreover, the virtual device 15 may be continuously displayed until the display module 14 receives another piece of information of the setting virtual device gesture 22, and a virtual device 15 is re-displayed according to the other setting virtual device gesture 22.

Figure 6:
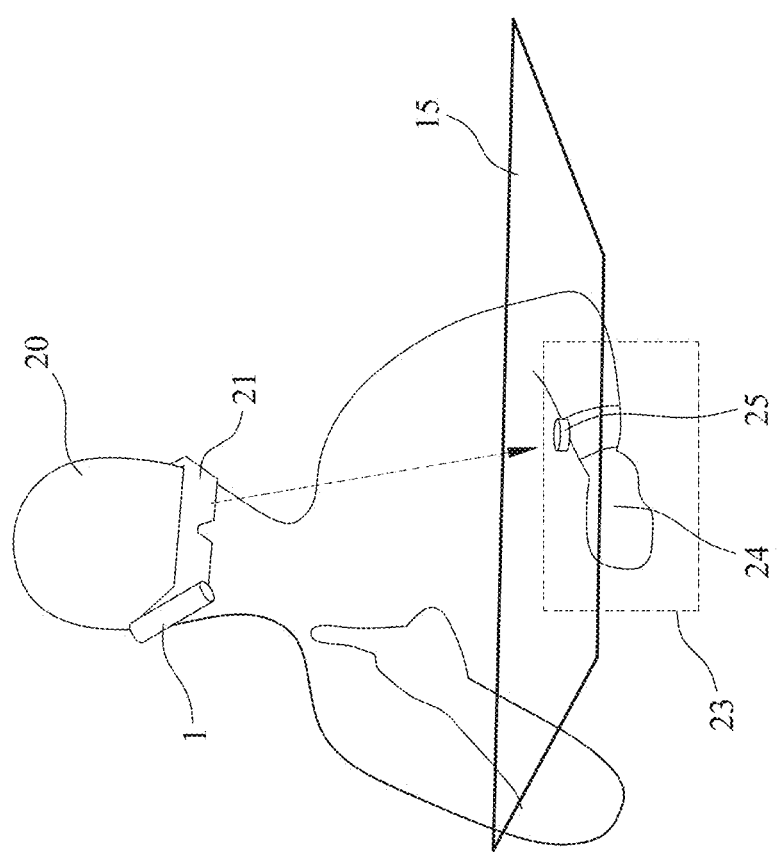
FIG. 6 is a schematic diagram illustrating the second method of operating the wearing mode of the present invention.

FIG. 6 is a schematic diagram illustrating the second method of operating the wearing mode of the present invention. Please refer to FIG. 6. In the second operation method of the wearing mode, the sensor 1 is configured on a glasses device 21 as well, and the glasses device 21 may be worn on the head by the user 20. When the sensor 1 detects that a hand feature 23 lasts a period of time, the sensor 1 turns on the virtual device 15 by means of the display module 14; the sensor 1 also sets the direction and position of the virtual device 15 by the hand feature 23. In the second method of operating the wearing mode of the present invention, a setting virtual device feature (not shown in FIGs.) may be the hand feature 23.

With regard to the hand feature 23 in the second method of operating the wearing mode, the user 20 may choose to display the hand feature 23 by wearing a watch 25 (the sensor 1 detects a mark on the watch 25, such as a QR code), or by not wearing a watch 25 (the sensor 1 detects the wrist 24 of the user 20). When the sensor 1 detects that the hand feature 23 conforms to the setting virtual device feature (not shown in FIGs.) for a period of time, the virtual device 15 may be turned on.

Figure 7:
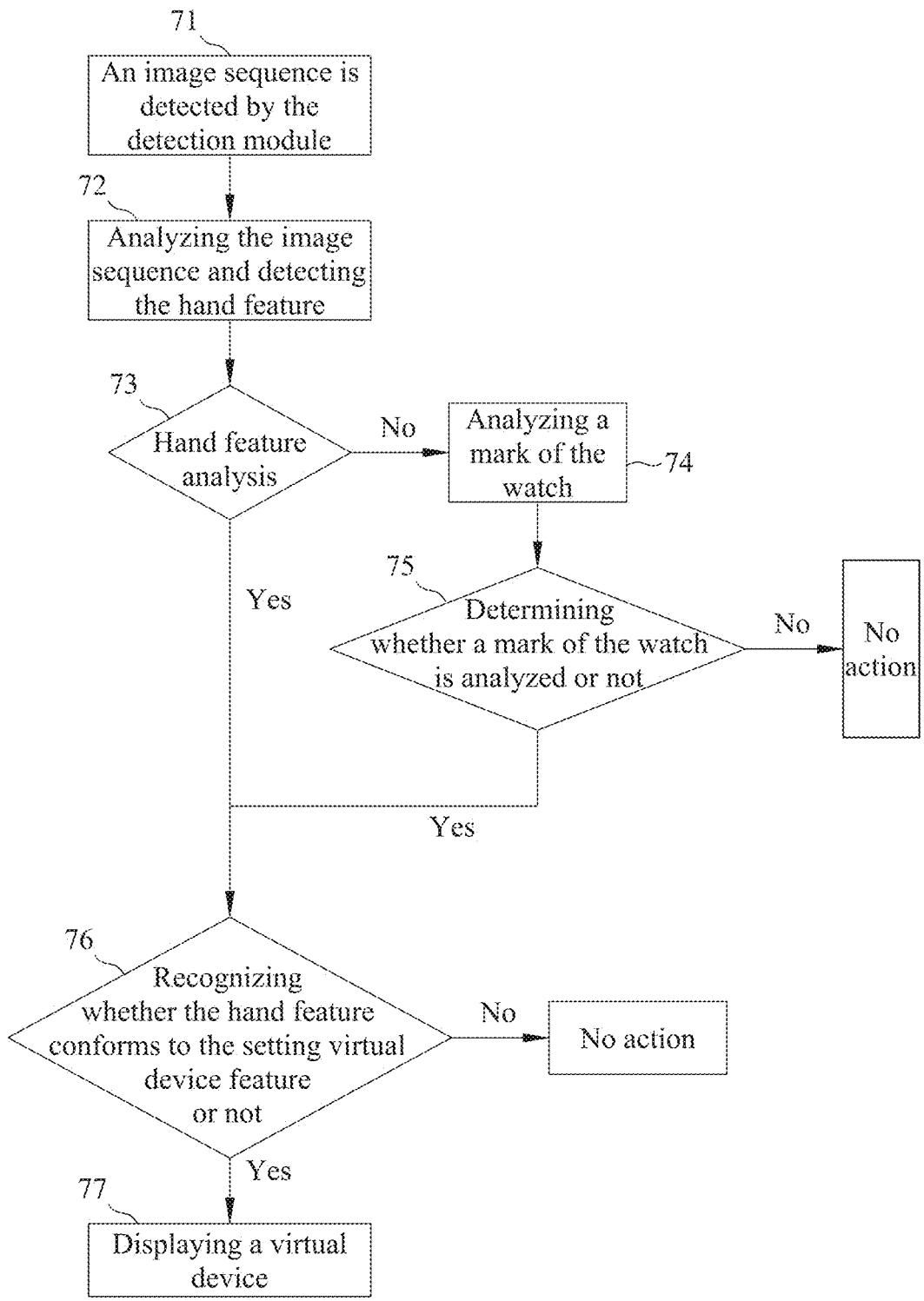
FIG. 7 is a flow diagram illustrating the flow chart generating the virtual device in accordance with the second embodiment of the present invention.

FIG. 7 is a flow diagram illustrating the method of generating the virtual device in accordance with the second embodiment of the present invention. Please refer to FIGS. 1, 6 and 7. The generating process 70 of the virtual device may include Steps 71-77. Step 71 shows an image sequence S1 that is detected by the detection module 11 of the present invention. Step 72 shows the hand feature extraction submodule 16 of the present invention analyzing the image sequence S1 and detecting the hand feature 23 of the user 20. Step 73 shows the hand feature extraction submodule 16 of the present invention determining whether a wrist 24 is analyzed or not. If a wrist 24 is not analyzed by the hand feature extraction submodule 16 in Step 73, Step 73 goes straight to Step 74. If a wrist 24 is analyzed by the hand feature extraction submodule 16 in Step 73, then Step 73 goes to Step 76. Step 74 shows the hand feature extraction submodule 16 of the present invention analyzing a mark of the watch 25. Step 75 shows the hand feature extraction submodule 16 determining whether a mark of the watch 25 is analyzed or not. If a wrist 24 is not analyzed by the hand feature extraction submodule 16 in Step 74, the sensor 1 will take no action. If a watch 25 is analyzed by the hand feature extraction submodule 16 in Step 74, Step 74 goes to Step 76. Step 76 shows the recognition module 13 recognizing whether the hand feature 23 conforms to the setting virtual device feature (not shown in FIGs.) and whether the setting virtual device feature lasts longer than a predetermined time or not. Step 77 shows the display module 14 of the present invention displaying a virtual device 15 for the user 20. In the second embodiment of the present invention, the hand feature extraction submodule 16 may be a RGB-D camera (such as Microsoft Kinect).

Each step is described in more details as follows. In Step 71, the detection module 11 of the re-anchorable virtual panel 10 configured in the sensor 1 may detect the image sequence S1, and the hand feature extraction submodule 16 of the detection module 11 analyzes the hand feature 23 of the user 20 in the image sequence S1.

In Step 72, the hand feature extraction submodule 16 analyzes the hand feature 23. Since the visual angle and direction of an eye are slightly different from those of the wearing sensor 1, the present invention uses the method of the vision-based robust calibration (ViRC) in the prior art to find out the relationship between the sensor 1 and the eye in space. By calculating the parameters of the coordinate transformation of the sensor 1 and the eye in space, the coordinate system of the sensor 1 is transformed to the coordinate system of the eye (left eye or right eye) of the user 20, so that the visual angle of the sensor 1 may be transformed to the visual angle of the user 20's eye. The method of the vision-based robust calibration will be described in more detail in Step 74.

In Step 73, the hand feature extraction submodule 16 analyzes whether the hand feature 23 is a wrist 24 or not. In the process of analyzing whether the hand feature 23 is a wrist 24 or not, the present invention uses the prior arts to do the analysis, and the analysis is done mainly via a hand-shaped classifier (not shown in FIGs.) and a skin color classifier (not shown in FIGs.), to detect the position of the hand feature 23. The hand-shaped classifier (not shown in the FIGs.) detects the position of the hand feature 23 by training the oriented gradients histogram feature of the front, the back and the lateral part of the hand. The skin color classifier (not shown in the FIGs.) detects the skin color zone of the image by means of the skin color model (not shown in FIGs.) suggested in the prior art.

Figure 8:
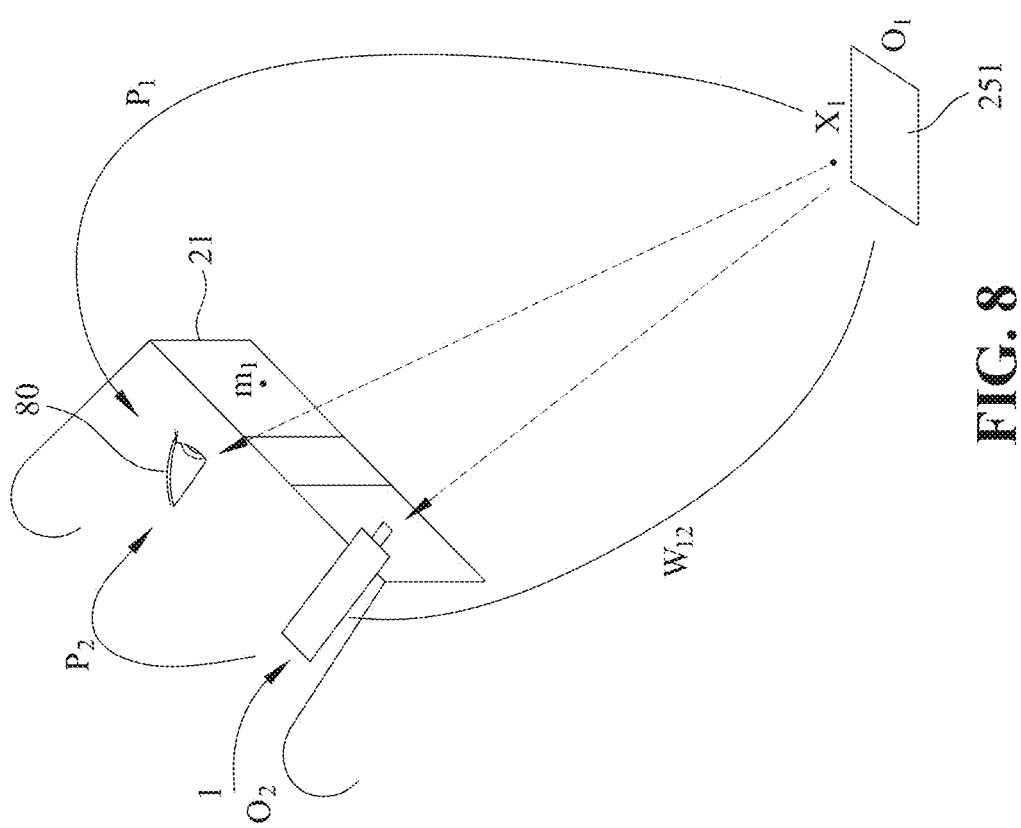
FIG. 8 is a schematic diagram illustrating the method of analyzing the mark of the watch.

In Step 73, if the hand feature extraction submodule 16 does not detect the hand feature 23 as a wrist 24, Step 73 goes to Step 74. In Step 74, the hand feature extraction submodule 16 analyzes the mark of the watch 25. In an embodiment of the present invention, the mark may be a QR code. FIG. 8 is a schematic diagram illustrating the method of analyzing the mark of the watch. Please refer to FIG. 8. If the position of the mark 251 of the watch is $X_1$, the projection matrix of a point (two-dimensional) $m_1$ is projected from $X_1$ in three-dimensional space onto the glasses device 21 is set as $P_1$. The relationship with the coordinate system based on $x_1$ can be illustrated by the following formula: $sm_1 = P_1 X_1 = P_2 W_{12} X_1$, wherein s is a ratio parameter, $W_{12}$ is a transformation matrix transforming the coordinate system $O_1$ of the mark 251 of the watch to the coordinate system $O_2$ of the sensor 1, and $P_2$ represents a projection matrix transforming $O_2$ to the coordinate system of the glasses device 21. Since the position of the user' eye 80 cannot be directly calculated from $O_2$, the projection matrix $P_2$ should be calculated in advance. $P_2$ may be divided into the following four matrixes: $P_2 = A^{on} W_{45}^{on} W_{34}^{on} W_{23}^{off}$. These four matrixes may be calculated in two stages: an off-line stage and an on-line stage respectively.

Figure 9:
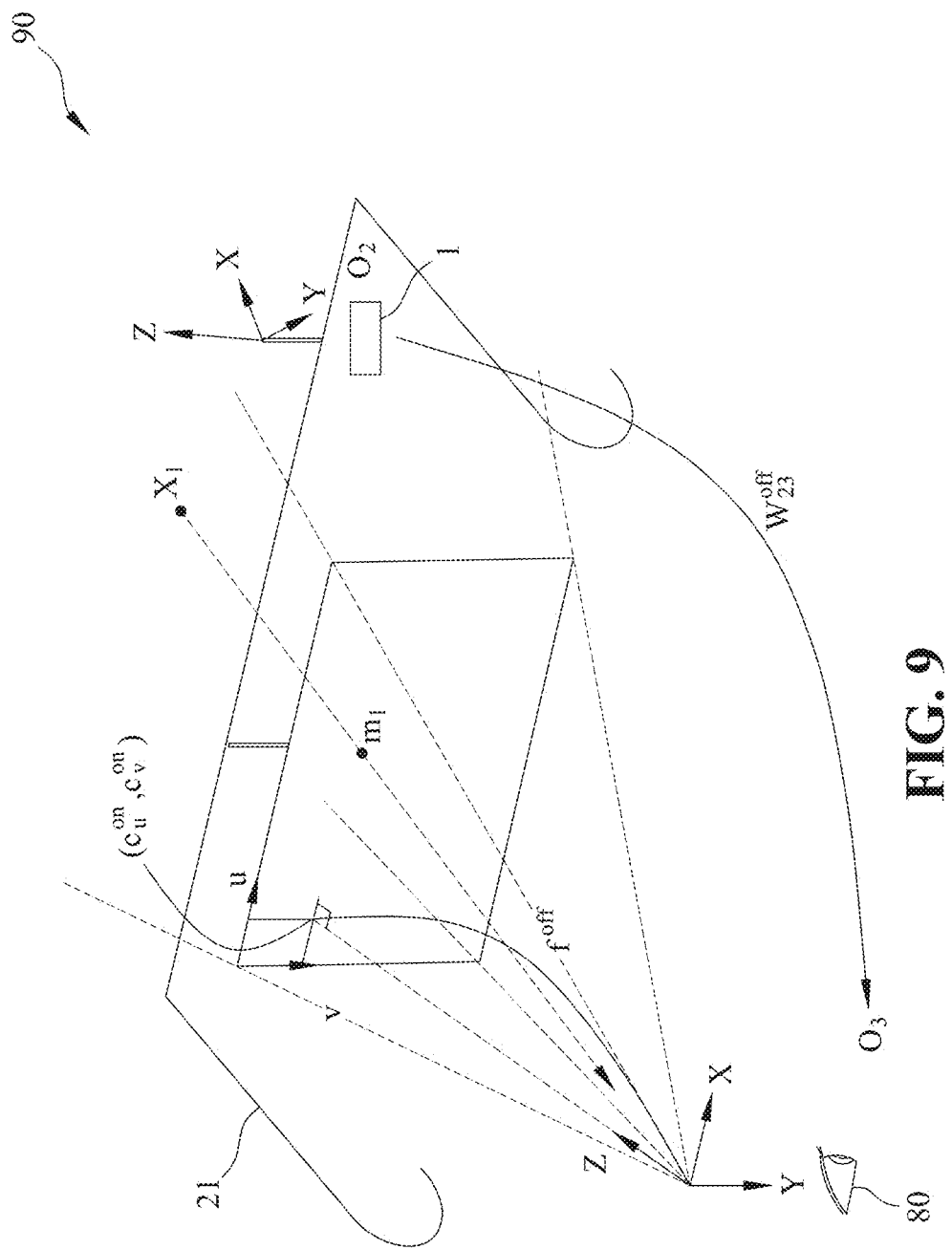
FIG. 9 is a schematic diagram illustrating the method of calculating the direction of the user's eye in the off-line stage.

FIG. 9 is a schematic diagram illustrating the method of calculating the user's eye in the off-line stage. Please refer to FIG. 9. In the off-line stage, the approximate position of the eye 80 may be calculated by the perspective-n-point algorithm in the prior art. With regard to the perspective projection model 90, the glasses device 21 is presumed to be an image plane, and the direction that the user's eye looks out is vertical to the image plane. The rays that enable the eye 80 of the user to look out is an optical axis, and the position of the eye 80 of the user 20 is located in the optical center of the perspective projection model 90. An external parameter of the sensor 1, which is the position and direction of the sensor 1 in three-dimensional space, may be calculated by calculating an intrinsic parameter, coordinate points and their two-dimensional to three-dimensional correspondences. $A^{off}$ is set as the intrinsic parameter matrix of the eye 80:

$$A^{off} = \begin{pmatrix} f^{off} & 0 & c_u^{off} \\ 0 & f^{off} & c_v^{off} \\ 0 & 0 & 1 \end{pmatrix},$$

wherein $f^{off}$ is the distance from the user's eye 80 to the glasses device 21, and $(c_u^{off}, c_v^{off})$ is a point (u, v) in the coordinate of the glasses device 21. $W_{23}^{off}$ is set as a transformation matrix transforming the coordinate system $O_2$ of the sensor 1 to an approximate coordinate system $O_3$ corresponding to the user's eye 80. $W_{23}^{off}$ may be calculated from the perspective-n-point algorithm: $sm_1 = P_2 W_{12} X_1 = A_{off} W_{23}^{off} W_{12} X_1$.

Figure 10:
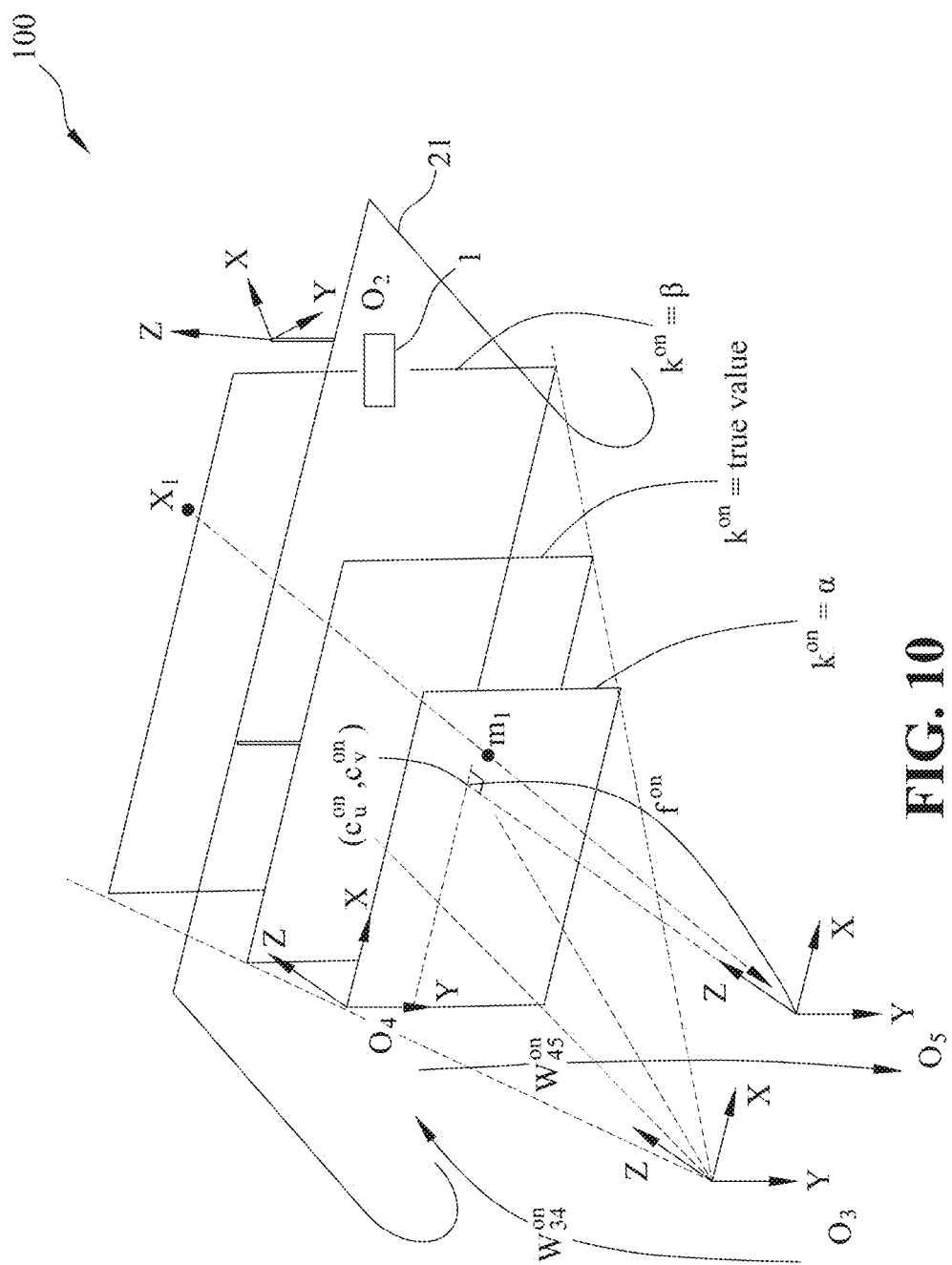
FIG. 10 is a schematic diagram illustrating the method of calculating the direction of the user's eye in the on-line stage.

FIG. 10 is a schematic diagram illustrating the method of calculating the user's eye in the on-line stage. Please refer to FIG. 10. In the on-line stage, the accurate position of the user's eye should be calculated. Please refer to the perspective projection model 100. $W_{34}^{on}$ is set as a transformation matrix transforming the approximate coordinate system $O_3$ of the user's eye to the coordinate system $O_4$ of the glasses device 21, and $W_{45}^{on}$ is set as a transformation matrix transforming $O_4$ to the accurate coordinate system $O_5$ of the user's eye 80. $W_{34}^{on}$ and $W_{45}^{on}$ are represented as follows:

$$W_{34}^{on} = \begin{bmatrix} 1 & 0 & 0 & \frac{c_u^{off}}{k^{on}} \\ 0 & 1 & 0 & \frac{c_v^{off}}{k^{on}} \\ 0 & 0 & 1 & \frac{-f^{off}}{k^{on}} \\ 0 & 0 & 0 & 1 \end{bmatrix}, W_{45}^{on} = \begin{bmatrix} 1 & 0 & 0 & \frac{-c_u^{on}}{k^{on}} \\ 0 & 1 & 0 & \frac{-c_v^{on}}{k^{on}} \\ 0 & 0 & 1 & \frac{f^{on}}{k^{on}} \\ 0 & 0 & 0 & 1 \end{bmatrix},$$

wherein $k^{on}$ is a pixel density, and the relative position relation between the user's eye 80 and the glasses device 21 can be represented by $A^{on}$:

$$A^{on} = \begin{pmatrix} f^{on} & 0 & c_u^{on} \\ 0 & f^{on} & c_v^{on} \\ 0 & 0 & 1 \end{pmatrix}.$$

After the methods of calculating the user's eye in the off-line and on-line stage, the hand feature extraction submodule 16 of the present invention may analyze the mark 251 of the watch, and this is followed by the hand feature extraction submodule 16 transmitting the feature analysis information S2 to the recognition module 13. Step 74 then goes to Step 75.

In Step 75, the recognition module 13 recognizes whether or not the feature analysis information S2 is a mark 251 of the watch. If the recognition module recognizes that the feature analysis information S2 is a mark 251 of the watch, the recognition module 13 goes to Step 76; if not, the sensor 1 will take no action.

In Step 76, the recognition module 13 recognizes whether or not the image sequence S1 includes the hand feature 23, and whether the hand feature 23 conforms to the setting virtual device feature (not shown in FIGs.) in a predetermined time period TH. If the recognition module 13 recognizes the hand feature 23, the recognition module 13 goes to Step 77; if the recognition module 13 does not recognize the hand feature 23, the sensor 1 will take no action. In this embodiment, the predetermined time period TH is sets as 3 seconds.

Figure 11:
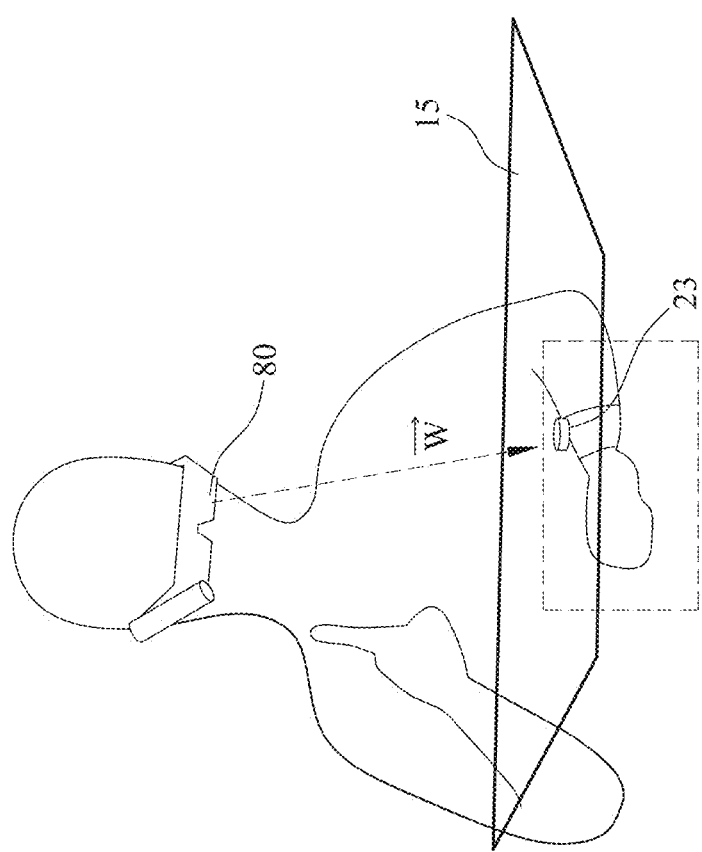
FIG. 11 is a schematic diagram illustrating the positioning method of the virtual device of the second method of operating the wearing mode in the present invention.

In Step 77, the display module 14 may display a virtual device 15 for the user 20. FIG. 11 is a schematic diagram illustrating a positioning method of the virtual device of the second method of operating the wearing mode in the present invention. Please refer to FIG. 11. The position and direction of the virtual device 15 are determined by the positions of the eye 80 and the hand feature 23. If the position of the eye 80 in three-dimensional space is presumed to be $p=(a_2, b_2, c_2)$, and assuming the position of the hand feature 23 is detected at $q=(a_1, b_1, c_1)$, then at this time, the position p of the user' eye 80 and the position q of the hand feature 23 may form a ray $\vec{w} = (a_1-a_2, b_1-b_2, c_1-c_2)$. In the second method of operating the wearing mode, the position and direction of the virtual device 15 are defined to be vertical to the ray $\vec{w}$ and to pass through the position q of the hand feature 23. Therefore, the present invention defines the surface equation of the virtual device 15 in three-dimensional space as $\vec{w} \cdot (x-a_1 x, y-b_1 y, z-c_1 z)^T = 0$.

After the virtual device 15 of the present invention is generated, the virtual device 15 may be displayed continuously until the future action of turning on the virtual device 15 is detected by the re-anchorable virtual panel 10. FIGS.

Figure 12B:
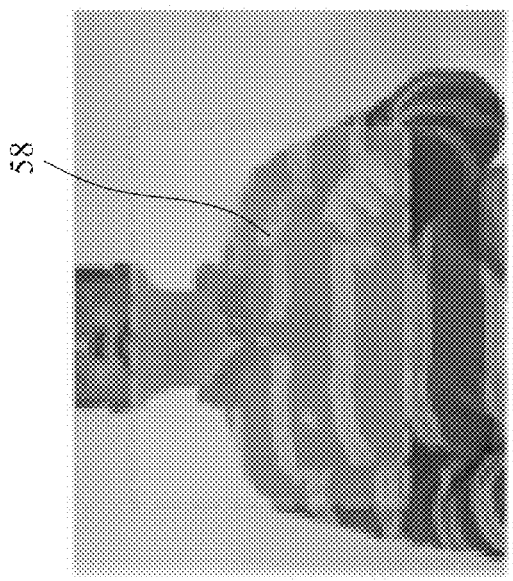
FIG. 12B is a schematic diagram illustrating the operation method of the virtual device of the present invention.
Figure 12A:
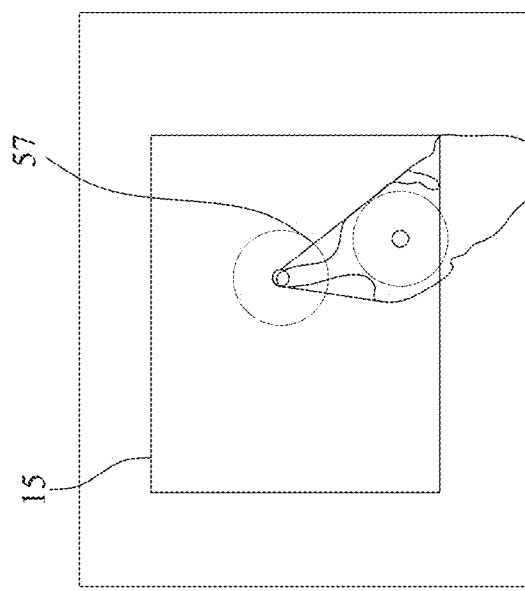
FIG. 12A is a schematic diagram illustrating the operation method of the virtual device of the present invention.

12A and 12B are schematic diagrams illustrating the operation methods of the virtual device of the present invention. Please refer to FIG. 12 A. After the virtual device 15 of the present invention is generated, the user 20 puts down the hand that sets/sets up the virtual device 15 and raises another hand's forefinger 57. When the forefinger 57 is detected by the detection module 11, the re-anchorable virtual panel 10 continuously traces the fingertip part of the forefinger 57, and projects the three-dimensional position of the fingertip onto the virtual device 15 in two-dimensional space, as a mouse cursor of the virtual device 15. Please refer to FIG. 12B. When the finger position detection submodule 12 of the re-anchorable virtual panel 10 detects that the forefinger 57 performs a forward pressing action 58 on the virtual device 15 (the forward pressing action 58 is pressed towards the sensor 1, and is an accelerated motion with an acceleration greater than a threshold). The forward pressing action 58 is regarded as a click gesture. The user 20 may achieve the goal of controlling a remote device (not shown in the FIGs.) by pressing a virtual button.

FIG. 13 is a schematic diagram illustrating a method that combines the present invention with the remote operation of a TV. Please refer to FIG. 13. In the operating method of the remote mode, the sensor 1 may be configured on a home appliance device 130 or configured on a wall 131 in an interior space. In this embodiment, the sensor 1 of the present invention may be configured on a home appliance device 130. In the remote mode, the user does not need to wear any device; while in operation, the user only needs to be within the detecting range that sensor 1 can detect. The home appliance device 130 may provide a visual feedback to the user 20 when it is operated. In the operating method of the remote mode of the present invention, the generating method of the virtual device 15 of the remote mode is identical to the generating process 30 of the virtual device in the first embodiment of the present invention. With regard to the operation method of the virtual device 15, please refer to FIG. 12B once again. When the finger position detection submodule 12 of the re-anchorable virtual panel 10 detects that the forefinger 57 performs a forward pressing action on the virtual device 15 (the forward pressing action 58 is pressed towards the sensor 1, and is an accelerated motion with an acceleration greater than a threshold), the forward pressing action 58 is regarded as a click gesture. The user 20 may achieve the goal of controlling a remote device 120 by pressing a virtual button.

Figure 14A:
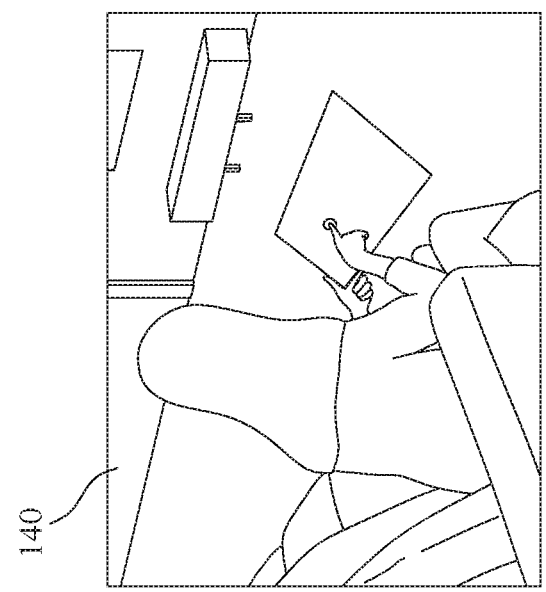
FIG. 14A is a schematic diagram illustrating the operation gesture of the remote mode of the present invention.
Figure 14B:
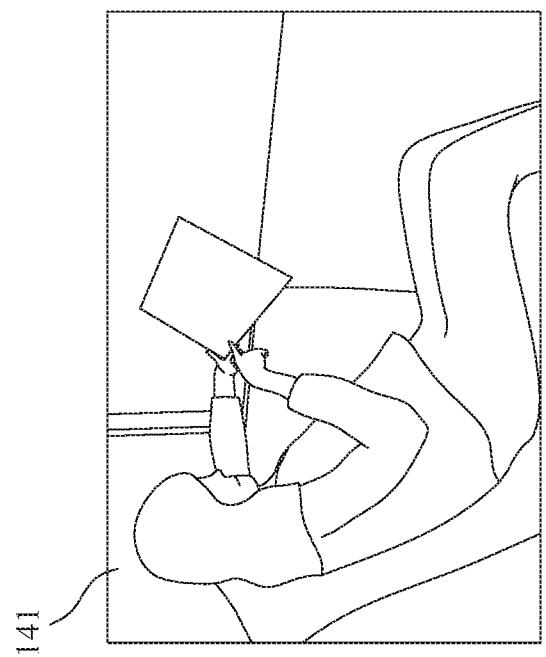
FIG. 14B is a schematic diagram illustrating the operation gesture of the remote mode of the present invention.

FIGS. 14A and 14B are schematic diagrams illustrating the operation gesture of the remote mode of the present invention. Please refer to FIGS. 14A and 14B. When using the re-anchorable virtual panel 10, the user 20 may control the virtual device 15 of the present invention with the most comfortable gestures 140 and 141 at the time. The mobility and convenience are greatly enhanced when the virtual device 15 is being operated by the user.

In conclusion, since the user using the remote mode does not need to wear any display device, so better comfortability may be provided in comparison with the wearing mode. On the other hand, since the wearing mode is not restricted by the environment, therefore the wearing mode provides better mobility and convenience.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A re-anchorable virtual panel in a three-dimensional space, comprising:
    a detection module, detecting an image sequence, analyzing a feature information of a user in the image sequence, and generating a feature analysis information of the user according to the feature information, and transmitting the feature analysis information;
    a recognition module, receiving the feature analysis information, recognizing whether the feature analysis information conforms to a setting virtual device feature and whether the setting virtual device feature lasts longer than a predetermined time or not, and transmitting the feature analysis information; and
    a display module, receiving the feature analysis information, and displaying a virtual device for the user according to the feature analysis information;
    wherein the virtual device is continuously displayed until the display module receives another feature analysis information, and the virtual device is re-displayed for the user according to the other feature analysis information.

2. The re-anchorable virtual panel as claimed in claim 1, wherein the detection module includes a finger position detection submodule and a hand feature extraction submodule, the finger position detection submodule separates a hand position of the user from the image sequence according to an information on depth, the finger position detection submodule further calculates a three-dimensional finger position information of the user and generates the feature analysis information, and the hand feature extraction submodule analyzes the feature information of the user in the image sequence and generates the feature analysis information.

3. The re-anchorable virtual panel as claimed in claim 2, wherein the hand feature extraction submodule is a RGB-D camera.

4. The re-anchorable virtual panel as claimed in claim 2, wherein the finger position detection submodule is a finger position extraction sensor (Leap Motion).

5. The re-anchorable virtual panel as claimed in claim 1, wherein the feature analysis information is one of a finger position information and a hand feature information of the user.

6. The re-anchorable virtual panel as claimed in claim 1, wherein the feature analysis information and the setting virtual device feature are an L-shaped hand gesture.

7. The re-anchorable virtual panel as claimed in claim 6, wherein the L shape hand gesture is formed by a thumb part and a forefinger part.

8. The re-anchorable virtual panel as claimed in claim 7, wherein the display module sets a generating position of the virtual device according to a position of a part between the thumb part and the forefinger part, determines a direction and an angle of the virtual device according to the positions of the thumb part and the forefinger part, and generates the virtual device.

9. The re-anchorable virtual panel as claimed in claim 1, wherein the display module determines the position and direction of the virtual device according to a gaze direction of the user and the position of the feature analysis information.

10. The re-anchorable virtual panel as claimed in claim 1, wherein the feature analysis information and the setting virtual device feature are the shape and color of the user's wrist.

11. The re-anchorable virtual panel as claimed in claim 1, wherein the feature analysis information and the setting virtual device feature are a mark of a watch worn by the user.

12. The re-anchorable virtual panel as claimed in claim 11, wherein the mark of the watch is a QR code.

13. The re-anchorable virtual panel as claimed in claim 1, wherein the re-anchorable virtual panel is configured in a sensor.

14. The re-anchorable virtual panel as claimed in claim 13, wherein the sensor is configured in one of a head wear device, a home appliance device and a wall of an interior space.

15. A method of generating a re-anchorable virtual panel device, comprising the steps of:
detecting an image sequence via a detection module, analyzing a feature information of a user in the image sequence, generating a feature analysis information of the user according to the feature information, and transmitting the feature analysis information to a recognition module;
recognizing whether the feature analysis information is a setting virtual device feature by the recognition module;
recognizing whether the setting virtual device feature lasts longer than a predetermined time by the recognition module after recognizing that the feature analysis information is the setting virtual device feature;
transmitting the feature analysis information to a display module by the recognition module after recognizing that the setting virtual device feature lasts longer than the predetermined time; and
displaying a virtual device for the user by the display module according to the feature analysis information, wherein the virtual device is continuously displayed until the display module receives another feature analysis information, and the virtual device is re-displayed according to the other feature analysis information.

16. The method of generating a re-anchorable virtual panel device as claimed in claim 15, wherein the feature analysis information is one of a finger position information and a hand feature information of the user.

17. The method of generating a re-anchorable virtual panel device as claimed in claim 15, wherein the feature analysis information and the setting virtual device feature are an L-shaped hand gesture.

18. The method of generating a re-anchorable virtual panel device as claimed in claim 17, wherein the L-shaped hand gesture is formed by a thumb part and a forefinger part.

19. The method of generating a re-anchorable virtual panel device as claimed in claim 15, wherein the feature analysis information and the setting virtual device feature are the user's wrist shape and color.

20. The method of generating a re-anchorable virtual panel device as claimed in claim 15, wherein the feature analysis information and the setting virtual device feature are a mark of a watch worn by the user.

21. The method of generating a re-anchorable virtual panel device as claimed in claim 20, wherein the mark of the watch is a QR code.

22. The method of generating a re-anchorable virtual panel device as claimed in claim 15, further comprising an operation method of the re-anchorable virtual panel device, comprising the steps of:
putting down the hand that sets the virtual device and raises another hand's forefinger after the virtual device is generated;
continuously tracing a fingertip of the other hand's forefinger by the detection module and projecting a three-dimensional position of the fingertip of the forefinger on the virtual device in a two-dimensional space when the other hand's forefinger is detected by the detection module; and
when the detection module detects that the forefinger performs a forward pressing action on the virtual device, the forward pressing action is being regarded as a click gesture.

23. The method of generating a re-anchorable virtual panel device as claimed in claim 22, wherein the forward pressing action is an accelerated motion with an acceleration greater than a threshold.

* * * * *